US009313224B1

(12) United States Patent
Roskind

(10) Patent No.: US 9,313,224 B1
(45) Date of Patent: Apr. 12, 2016

(54) CONNECTIVITY PROTECTOR

(75) Inventor: James Roskind, Redwood City, CA (US)

(73) Assignee: Google Inc., Mountain View, CA (US)

(*) Notice: Subject to any disclaimer, the term of this patent is extended or adjusted under 35 U.S.C. 154(b) by 880 days.

(21) Appl. No.: 12/895,163

(22) Filed: Sep. 30, 2010

(51) Int. Cl.
*G06F 15/16* (2006.01)
*H04L 29/06* (2006.01)

(52) U.S. Cl.
CPC ......... *H04L 63/1458* (2013.01); *H04L 63/1408* (2013.01)

(58) Field of Classification Search
CPC ..................... H04L 63/1458; H04L 63/1408
USPC ...................... 709/223, 224, 232, 238; 726/22
See application file for complete search history.

(56) References Cited

U.S. PATENT DOCUMENTS

| 6,789,203 | B1* | 9/2004 | Belissent ..................... 726/22 |
| 7,231,471 | B2* | 6/2007 | Uzun et al. .................. 710/52 |
| 7,984,493 | B2* | 7/2011 | Jones .......................... 726/12 |
| 2005/0091355 | A1* | 4/2005 | Keohane et al. ............. 709/223 |
| 2006/0036727 | A1* | 2/2006 | Kurapati et al. ............. 709/224 |
| 2006/0155841 | A1* | 7/2006 | Okude et al. ................ 709/224 |
| 2007/0157306 | A1* | 7/2007 | Elrod et al. ................. 726/14 |
| 2008/0085719 | A1* | 4/2008 | Kuchibhotla et al. ....... 455/452.1 |
| 2009/0037592 | A1* | 2/2009 | Lyon ............................ 709/228 |
| 2009/0077233 | A1* | 3/2009 | Kurebayashi et al. ....... 709/224 |
| 2011/0055921 | A1* | 3/2011 | Narayanaswamy et al. .. 726/22 |
| 2011/0119761 | A1* | 5/2011 | Wang et al. .................. 726/23 |

OTHER PUBLICATIONS

"Ask the Security Expert: Questions & Answers: Can service providers prevent DDoS attacks?" Expert Response from Ed Skoudis, TechTarget.com, Apr. 9, 2007, 3 pages.
"Distributed Denial of Service Threats: Risks, Mitigation, and Best Practices," Cisco Systems, Inc., publication date unknown, latest copyright date 2005, 12 pages.
He et al., "Detecting SYN Flooding Attacks Near Innocent Side," Mobile Ad-Hoc and Sensor Networks, Lecture Notes in Computer Science, vol. 3794, Springer-Verlag Berlin Heidelberg 2005, pp. 443-452.
Wang et al., "Detecting SYN Flooding Attacks," EECS Department, The University of Michigan, Ann Arbor, MI, 2002, 10 pages.

* cited by examiner

*Primary Examiner* — Brian J Gillis
*Assistant Examiner* — Michael A Keller
(74) *Attorney, Agent, or Firm* — McDermott Will & Emery LLP

(57) ABSTRACT

A method of protecting connectivity in a network is provided. The method includes monitoring a client communication received from a client on the network, and determining, based on the monitoring, to buffer the client communication. Next, to avoid a flood block response from a node on the network, based on the determining the client communication is buffered, whereby the connectivity of the client is protected.

24 Claims, 12 Drawing Sheets

```
  ( A method of protecting connectivity
         in a network. )
                │
                ▼
  ┌─────────────────────────────────────────┐
  │ Monitor a client communication received │──── 802
  │         from a client on the network.   │
  └─────────────────────────────────────────┘
                │
                ▼
  ┌─────────────────────────────────────────┐
  │ Determine, based on the monitoring, to  │──── 804
  │         buffer the client communication.│
  └─────────────────────────────────────────┘
                │
                ▼
  ┌─────────────────────────────────────────┐
  │ Buffer the client communication, to     │──── 806
  │ avoid a flood block response from a     │
  │ node on the network, whereby            │
  │ connectivity of the client is           │
  │ protected.                              │
  └─────────────────────────────────────────┘
                │
                ▼
             ( End )
```

FIG. 8D

CONNECTIVITY PROTECTOR

FIELD

The present application generally relates to internet connectivity.

BACKGROUND

Denial of Service attacks (DOS Attacks) represent a significant threat to server connectivity. In a type of DOS attack, a client attached to the Internet will send out multiple, false requests to connect to a targeted server causing the server to be unable to respond to other, legitimate connections. If done at a large enough scale, as in a Distributed DOS (DDOS) attack, these attacks are often successful in impacting server usefulness.

Many different ways of preventing DOS attacks have been designed, most being implemented at vulnerable hosts. These "server-side" countermeasures include sophisticated filtering, and measures to verify requests before allocating system resources.

Another potential site for preventing DOS attacks is on the "client-side." DOS communications can be prevented before reaching the host by blocking them before they leave the malicious client. One way of attempting to block DOS communications on the client-side is to try to detect the improper communications as they pass from an infected client through a router, or other components, such as modems and switches. If the router detects a DOS attack, the router could perform different blocking functions ("blocking"), including disconnecting the client from communications with the Internet.

The router-blocking described above relies upon the reliable detection of improper traffic from a connected client. Especially because the result can be so dramatic—disconnection from the Internet—"erroneous detection" of improper traffic can cause significant problems for user experience and support costs.

Notwithstanding the significant effects that it can have on users, currently, some implementations of client-side blocking cannot be tuned or disabled by a user. For example, a user may unknowingly purchase a router and be surprised when the router disconnects the user from the Internet without warning—even when no malicious traffic is originating from the connected client. In these situations, erroneous detection and the resulting disconnection may only be remedied by waiting for the disconnection to time out, rebooting the problem hardware, or in the extreme, replacing the problem hardware.

BRIEF SUMMARY

Embodiments described herein relate to protecting the connectivity of a node in a network. According to an embodiment, an apparatus for protecting connectivity on a network includes an outbound buffer, a connection monitor and a confirmation receiver. The connection monitor monitors a client communication received from a client on the network, and upon receipt of the client communication, the connection monitor determines, based on the monitoring, to buffer the communication in the outbound buffer. Based on the determination of the connection monitor, to avoid a flood block response from a node on the network, the client communication is buffered in the outbound buffer, whereby the connectivity of the client is protected.

According to another embodiment, a method of protecting connectivity in a network is provided. The method includes monitoring a client communication received from a client on the network, and determining, based on the monitoring, to buffer the client communication. Next, to avoid a flood block response from a node on the network, based on the determining the client communication is buffered, whereby connectivity of the client is protected.

Further features and advantages, as well as the structure and operation of various embodiments are described in detail below with reference to the accompanying drawings.

BRIEF DESCRIPTION OF THE FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

FIG. 8D illustrates a flowchart of another computer-implemented method of protecting connectivity on a network according to an embodiment of the present invention.

DETAILED DESCRIPTION OF EMBODIMENTS

The following detailed description refers to the accompanying drawings that illustrate exemplary embodiments. Embodiments described herein relate to providing systems and methods for protecting connectivity in a network. Other embodiments are possible, and modifications can be made to the embodiments within the spirit and scope of this description. Therefore, the detailed description is not meant to limit the embodiments described below.

It would be apparent to one of skill in the relevant art that the embodiments described below can be implemented in many different embodiments of software, hardware, firmware, and/or the entities illustrated in the figures. Any actual software code with the specialized control of hardware to implement embodiments is not limiting of this description. Thus, the operational behavior of embodiments will be described with the understanding that modifications and variations of the embodiments are possible, given the level of detail presented herein.

Overview

Figure 1:
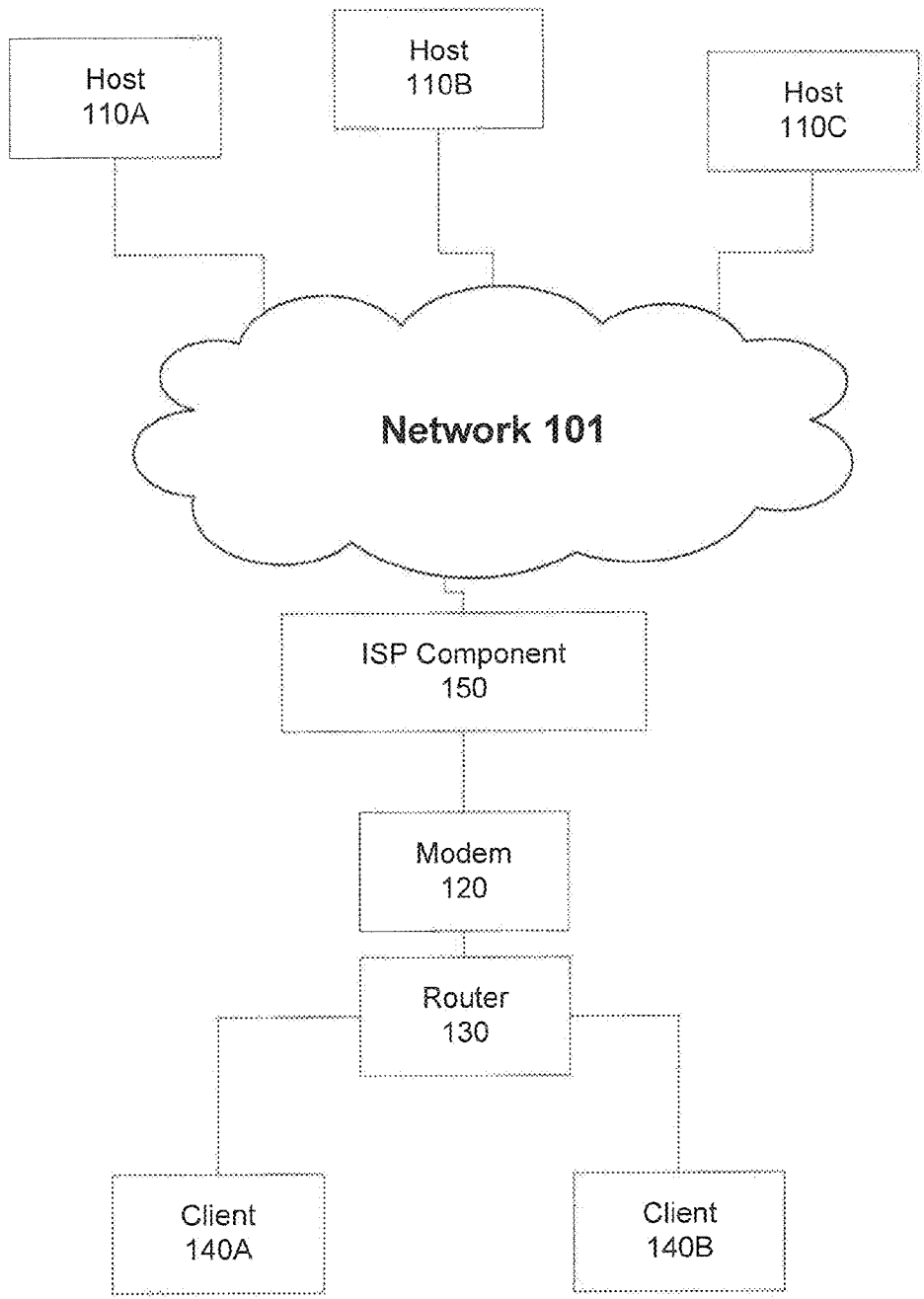
FIG. 1 illustrates a system of traditional connections between clients and servers using the internet.

FIG. 1 illustrates a connection between clients 140A-B and hosts (servers) 110A-C. FIG. 1 is a non-limiting diagram that simplifies the description of client-server connections by showing hosts 110A-C, Internet 101, internet service provider (ISP) 150, modem 120, router 130 and clients 140A-B.

As noted in the Background above, DOS (and DDOS) attacks involve the denial of service from a host to legitimate users. Denial of service attacks are performed in a variety of ways, many being termed "flood" attacks—so termed because of the flood of malicious client traffic directed at hosts 110A-C. Two types of flood DOS attacks are the "SYN-flood" attack and the "User Datagram Protocol (UDP)-flood" attack. These are relevant to some embodiments and are discussed further below with respect to FIGS. 2-7 and accompanying description.

Flood attack countermeasures are typically performed at web server 110A-C. Relevant to embodiments however, countermeasures can also be implemented at the client-side, e.g., in modem 120 and router 130. In some examples, ISP 150 can also be considered a client-side component, and also have countermeasures installed thereon. Flood blocking of a client at ISP 150 can also be termed "placing a quarantine" on an ISP customer and may be required by law in some jurisdictions. Embodiments can be designed to apply the techniques described herein to avoid a client being improperly placed in quarantine by an ISP because of improper traffic analysis and blocking.

Flood Blocker

Figure 2:
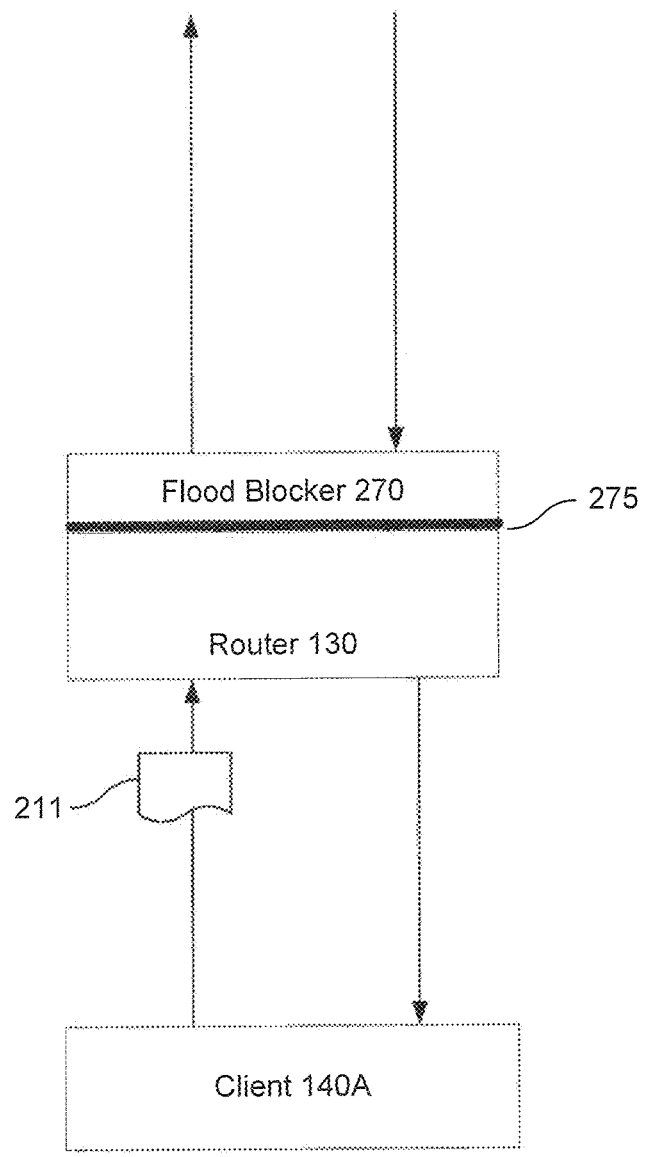
FIG. 2 illustrates an example router having a flood blocker component.

FIG. 2 depicts a client-side countermeasure—flood blocker 270—installed in router 130. Client 140A is also shown with traffic 211. In this example countermeasure, flood blocker 270 is configured to block a potential flood attack originating on connected client 140A. Flood blocker 270 can be implemented in a firewall-component, and as software or hardware. Flood blocker 270 can be implemented in router 130, as depicted on FIG. 2, or upstream in the traffic path, e.g., in modem 120 and ISP 150, as discussed with FIG. 1 above.

As shown in FIG. 2, flood blocker 270 analyzes traffic 211 (also termed "client communication") from client 140A. This analysis is performed using several different approaches, some being specifically tailored to the type of flood attack to be prevented. Some tailored approaches look at characteristics of the traffic to see if it contains evidence of an attack. Preventing two types of attacks—SYN flood and UDP flood—can be the object of flood blocker 270. Broadly speaking, to prevent these types of flood attacks, flood blocker 270 keeps track of how many outstanding requests have been sent by client 140A, and if this value exceeds a particular Block Threshold, connectivity is interrupted. As discussed below with respect to FIGS. 3-7, some embodiments discussed herein reduce the likelihood that non-malicious traffic will be confused for flood traffic.

Once potential attack traffic is identified, in an example, flood blocker 270 can proceed to block a portion of the traffic from the potentially attacking source—client 140A. This blocking of an attack by a client-side component can be termed client-side countermeasures or firewall blocking. Flood blocker 270 blocking actions can involve a range of activities, from merely intercepting and stopping potentially attacking data flows to completely stopping all traffic from client 140A using block 275. In some instances of this "complete stop" situation, flood blocker 270 has determined (correctly or incorrectly) that client 140A is an "infected" computer and thus should be completely prevented from outbound connectivity. For the user of client 140A, this blockage is very disruptive and resolving this situation can involve the "rebooting" of router 130—an operation requiring some technical knowledge and expertise.

As would be appreciated by one having skill in the relevant art, with access to the teachings herein, when flood blocker 270 erroneously applies disruptive client-side countermeasures to legitimate traffic, the user experience is negatively affected in a significant way.

Figure 3:
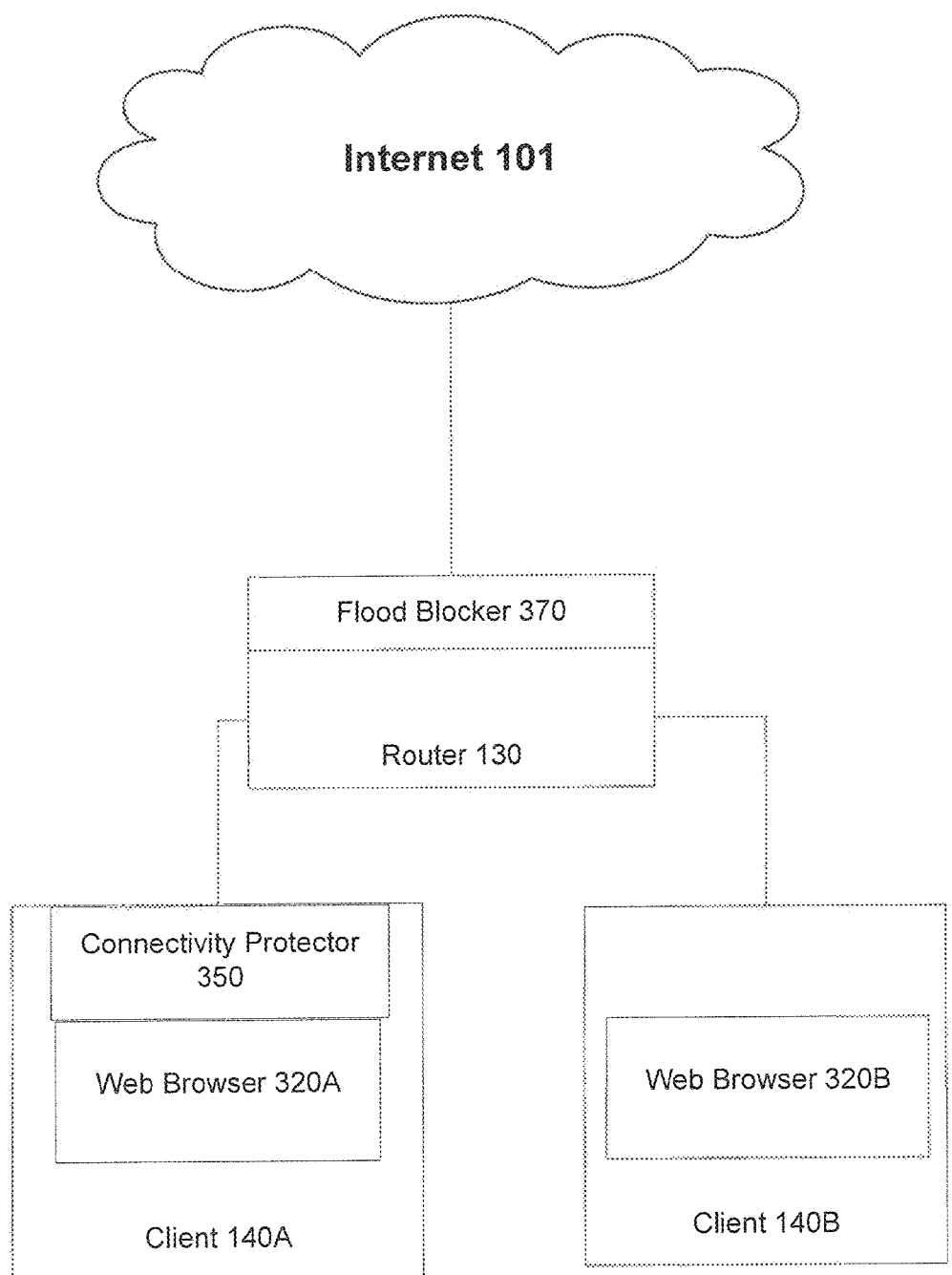
FIG. 3 illustrates a system of communication with clients having a connectivity protector, according to an embodiment.

FIG. 3 depicts a network 300 with two clients 140A-B connected by router 130 to network 101. As shown, client 140A contains connectivity protector 350 and web browser 320A, while client 140B contains web browser 320B. Router 130 is depicted as having flood blocker 370.

Similar to flood blocker 270 introduced above with respect to FIG. 2, flood blocker 370 is a component installed in router 130 that is configured to detect certain types of malicious traffic coming from connected clients 140A-B. To accomplish this, flood blocker 370 monitors traffic from clients 140A-B looking for characteristics of malicious traffic.

In an example, flood blocker 370 is designed to block a specific type of flood attack from client 140A—a so-called "SYN flood" DOS attack. As would be appreciated by one having skill in the relevant art, when a Transmission Control Protocol (TCP) connection is initiated, a client sends out a SYN request to a host computer. After receiving this SYN request, the host computer allocates resources for the connection and sends an acknowledgement (SYN ACK) back to the sending client, this acknowledgement/confirmation being a type of host communication. In a SYN flood attack, a flood of SYN requests is sent to a server, and that server may allocate resources for each erroneous SYN request. At some point, the amount of resources may exceed the available amount on the host, and the host may be unable to respond to legitimate requests.

To detect a SYN flood attack, one example set of characteristics that flood blocker 370 monitors the quantity of outstanding SYN requests sent to router 130 by clients 140A-B—e.g., SYN requests that have not been answered by a responsive SYN ACK. These unanswered SYN requests are also known as "unresponded to" requests or "half-open" connections. If flood blocker 370 determines that the total number of outstanding SYN requests exceeds a particular threshold ("Block Threshold" or "Blocking Threshold"), the client-side countermeasures described above are performed.

Connectivity Protector

Traditionally, web browsers would not issue SYN requests quickly enough to have the outstanding SYN request problems described above. Certain modern browsers however, such as GOGGLE CHROME from Google Inc., of Mountain View, Calif., send out requests much faster than older, slower browsers. Because of this rapid speed, modern browsers, such as Google Chrome can cause a user to be improperly blocked from network traffic as described above.

An embodiment of connectivity protector 350 shown on FIG. 3 and described herein, is designed to prevent the improper blocking of legitimate traffic from client 140A by flood blocker 370. In an embodiment, connectivity protector 350 can analyze and modify characteristics of the outbound traffic from client 140A so as to reduce the likelihood that flood blocker 370 will make an incorrect attack determination.

It should also be noted that, as used herein, the term "client" can broadly refer to any node on a network, and is not limited to any particular implementation. For example, in one embodiment depicted on FIG. 3, client 140A is a computer system running web browser 350 connected to a node—router 130. In another embodiment, depicted on FIG. 1, router 130 can be a "client" to another node upstream in the network—either modem 120 or ISP component 150, for example. As used herein, the term "client communication" can broadly refer to any communication from a client.

In an embodiment, connectivity protector 350 is configured to perform similar analysis and monitoring tasks to the ones performed by flood blocker 370. In an embodiment, like flood blocker 370, connectivity protector 350 also monitors the number of outstanding SYN requests, and also compares this number to a threshold number ("Protect Threshold"). Instead of blocking based on this determination, as with flood blocker 370, in an embodiment, connectivity protector 350 uses the Protect Threshold to modify the traffic flow from client 140A so as to correctly avoid the SYN flood blocking described above.

It should be noted that, as used by some embodiments herein, with respect to connectivity protector 350, the term "SYN request" can refer to the actual SYN request described above, or an instruction to send a SYN request. For example, if client 140A is described as "sending a SYN request" to connectivity protector 350, this can be the request itself to be forwarded by connectivity protector 350 to the relevant host, or an instruction to another component (not shown) to send a SYN request. Thus, after receiving an instruction to send a SYN request, in an embodiment, connectivity protector 350 can relay this instruction to another component to generate and send the SYN request.

In an embodiment, as monitored and analyzed by connectivity protector 350, when the total number of outstanding SYN requests equals or exceeds the Protect Threshold number, connectivity protector 350 will prevent the sending of additional SYN requests to router 130 until the outstanding number of SYN requests is reduced below the Protect Threshold.

In an embodiment, this number of outstanding requests is stored in a counter, such counter being incremented up when a SYN request is sent and decremented when an ACK is received. In an embodiment, the counter is in the network stack and can maintain the number of un-responded connections, e.g., SYN requests, that an internet application, such as a browser, has pending at any time. According to an embodiment, after a Protect Threshold is reached, if an attempt to open an additional connection is required, then the connection attempt is paused until the number of pending connections is less than the Protect Threshold. In an embodiment, the counter may set to track the number of attempted client connections to a specific host-destination. In another embodiment, the counter may be an aggregate counter, tallying all connections that are pending. In some embodiments, all TCP/IP connections may be monitored.

In an embodiment, a counter value is held in a variable, and when incremented or decremented by a variety of tasks and/or threads, may serve as a counter. In an embodiment, connectivity protector 350 analyzes the client communication (e.g., the SYN requests) and determines whether to increment a counter based on the determined type of the client communication. For example, as noted above if an outgoing client communication is a SYN request, the counter can be incremented, and if an ACK acknowledgement is received, the counter can be decremented.

In an embodiment, the counter is implicit, such as by having a fixed number of service threads or tasks that can handle connection initialization. In another embodiment, a fixed or restricted number of tasks may be used to implicitly count how many connections are pending, and avoid exceeding a threshold. In another embodiment, the counter is explicit, specifically tracking a type of request, using a value that is incremented and decremented according to the operation of connectivity protector 350.

Protect Threshold

In an embodiment, to be successful in preventing erroneous client-side countermeasures from being applied by flood blocker 370, the Protect Threshold number used by connectivity protector 350 is advantageously less than the Blocking Threshold number used for blocking in flood blocker 370. For example, if flood blocker 270 is configured to apply countermeasures at ten outstanding SYN requests, connectivity protector 350 could have a threshold of nine outstanding requests and avoid the countermeasure. By preventing the number of outstanding SYN requests from reaching the flood blocker 370 threshold, connectivity is protected, according to an embodiment.

For example, if the Protect Threshold is set to 10 outstanding requests, when this threshold is reached, connectivity protector 350 will stop the 11th request from being sent to router 130, waiting until the outstanding SYN request count is reduced, e.g., when a SYN ACK (also known as an "ACK") is received. In another embodiment, other comparisons of the number of outstanding requests to a Protect Threshold are used, e.g., the outstanding requests stopped only when greater than the Protect Threshold.

In an embodiment, the received SYN ACK does not have to be paired to an outstanding SYN request in order to reduce the amount of outstanding requests, rather it is only the receipt of an SYN ACK response that is significant. In another embodiment, the SYN ACK responses are paired with outstanding SYN requests before the counter is decremented. This analysis of response traffic to determine relevant responses can be termed analyzing host communication (e.g., SYN ACK responses).

In the example depicted in FIG. 3, client 140B does not have connectivity protector 350 installed, and thus does not have the protections described with respect to client 140A. Thus in this example, web browsers 320A-B could originate the same traffic, but with client 140A, connectivity protector has modified the characteristics of the traffic such that the traffic is not erroneously detected, while client 140B may be improperly blocked by flood blocker 370.

Figure 4:
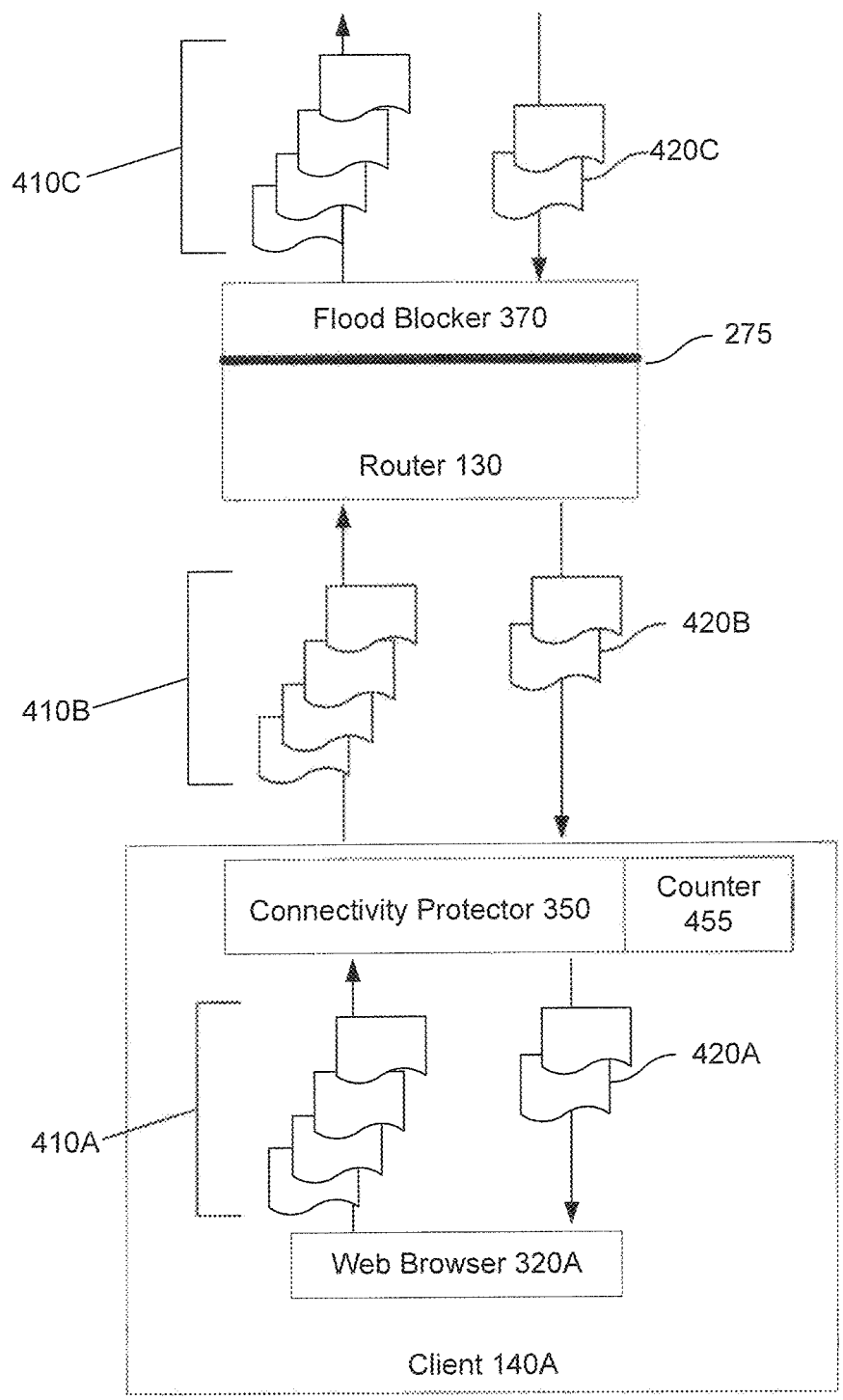
FIG. 4 illustrates operation of a connectivity protector, according to an embodiment.

FIG. 4 depicts an embodiment of connectivity protector 350, including client 140A having web browser 320A and router 130 having flood blocker 370. Client communication 410A-C and host communication 420A-C is shown, according to an embodiment. Connectivity protector 350 is depicted as having counter 455.

In an example depicted on FIG. 4, client communication 410A is a collection of SYN requests that have been rapidly issued from web browser 320A. In an embodiment, a series of rapid SYN requests can result when a browser is started with existing browser tabs initialized. If multiple tabs are initiated in the browser when the browser is started, then multiple SYN requests will be send out substantially simultaneously. As noted above, certain modern browsers can cause this rapid sending of SYN requests.

Still referring to the example from FIG. 4, upon receiving client communication 410A SYN requests, connectivity protector 350 analyzes the requests for relaying upstream and determines, based on the analyzing, whether to modify counter 455. Based on counter 455, connectivity protector 350 determines whether to either buffer or relay the client communication, e.g., client communication 410B. Upon receipt of client communication 410B, such traffic passes through flood blocker 370 and is relayed by client communication 410C to its destination. Flood blocker 370, in this example, maintains a counter of the number of outstanding requests relayed.

In this example, traffic 420C from a server host (host communication) represents the receipt at flood blocker 370 of server acknowledgement of a SYN request—a SYN ACK. Flood blocker 370 analyzes the host communication traffic 420C and relays it to connectivity protector 350. In an embodiment, connectivity protector 350 analyzes the incoming host communication 420B and, based on a determination, decrements counter 455 and relays traffic 420A to web browser 320A.

Different reasons exist for the differential response time between the responses, e.g., response times vary because the requests were sent to and about different servers.

This example is not intended to be limiting. One having ordinary skill in the relevant art will appreciate that the principles described herein could be applied to other, similar types of blocking by flood blocker 370.

In an embodiment, a general approach to determining and addressing erroneous firewall blocks is determined by the following process:

B1. What type of potential flood traffic is being monitored by flood blocker 370? For example, SYN flood attacks are monitored.

B2. What algorithm is being used to detect the type of flood traffic? For example, the total number of outstanding SYN requests is analyzed.

B3. What potential misidentification of legitimate traffic as flood traffic exists? For example, certain modern web browsers can generate a large amount of legitimate SYN requests.

B4. How can connectivity protector 350 modify the characteristics of the legitimate traffic to reduce the likelihood of misidentification? For example, connectivity protector 350 is configured to buffer SYN requests over a threshold amount, as described herein.

As would be appreciated by one having skill in the art, with access to the teachings herein, additional considerations/steps/approaches can be used beyond those listed in B1-B4 above.

Figure 5:
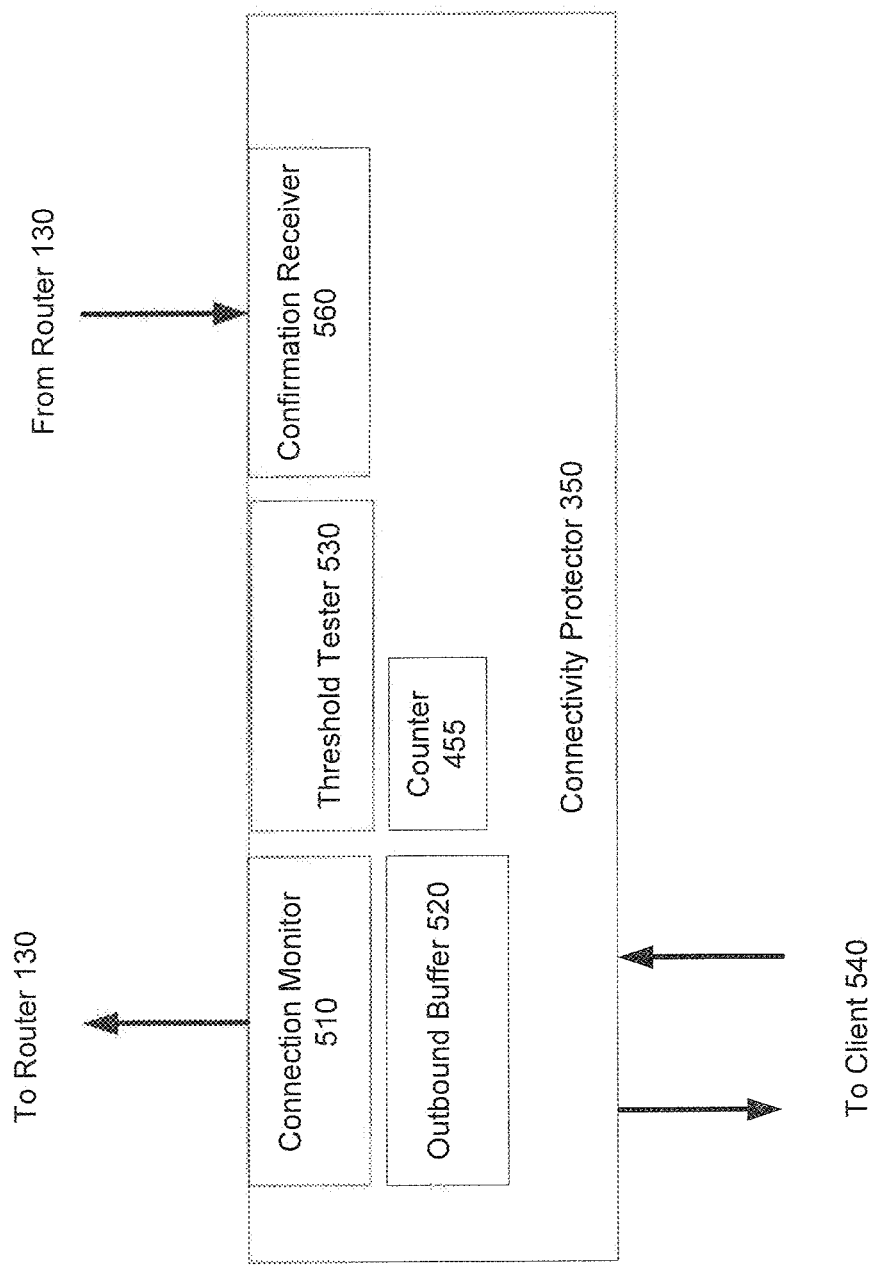
FIG. 5 illustrates a more detailed view of a connectivity protector, according to an embodiment.

FIG. 5 depicts connectivity protector 350 as containing connection monitor 510, outbound buffer 520, threshold tester 530, counter 455 and confirmation receiver 560. In an embodiment, connectivity protector 350 receives a SYN request or instructions to send a SYN request from client 540 and increments counter 455, such counter 455 maintaining a count of SYN requests to which no SYN ACK response has been received. In an embodiment, threshold tester 530 checks the status of counter 455 to see if the Protect Threshold has been met. If the Protect threshold has not been met, according to an embodiment, the request is approved for sending/relaying.

In an embodiment, if the Protect Threshold has been met, connectivity protector 530 implements steps to prevent the sending of an additional SYN request. In an example approach to preventing this transmission, connectivity protector 530 buffers the SYN request or instructions to send a SYN request in outbound buffer 520.

In other embodiments, to stop outbound SYN requests, connectivity protector 350 can perform one or more the following tasks P1-P3 either alone, or in combination:

P1. In an embodiment, connectivity protector can receive and temporarily hold the SYN request or instructions to send a SYN request in outbound buffer 520.

P2. In another embodiment, connectivity protector 350 can send a signal to client 540, requesting SYN requests be paused for a period of time.

P3. In another embodiment, connectivity protector can do a combination of P1 and P2—requesting a temporary holding of requests, and buffering any extra requests that are sent in outbound buffer 520.

The above list of tasks P1-P3 is illustrative and not intended to limit the invention. One having skill in the relevant arts will appreciate that other approaches to limiting/metering/restricting traffic could be used.

In an embodiment, confirmation receiver 560 receives a SYN ACK response relayed from router 130 and decrements counter 455, as noted above, such counter 455 maintaining a count of SYN requests to which no SYN ACK response has been received. In an embodiment, threshold tester 530 checks the status of counter 455 to see if the Protect Threshold has been met. In an embodiment, if counter 455 has returned below the Protect Threshold, any buffered requests stored in outbound buffer 520 are forwarded to their appropriate destinations.

Setting the Protect Threshold

As would be appreciated by one having skill in the relevant art, with access to the teachings herein, the threshold used by flood blockers 270, 370 is generally not disclosed by the manufacturers of the devices and, as noted above, is not tunable by the user. Because of this, embodiments of connectivity protector 350 use different methods of setting the limiting threshold number. In a non-limiting list below, T1-T7, different approaches to setting the limiting threshold in embodiments of connectivity protector 350 are discussed, such approaches being used alone or in combination:

T1. The threshold number could be set to an initial estimated number, and the user could be allowed to change manually. Users would generally need to be technically sophisticated to perform this modification.

T2. The threshold number could be set to an initial estimated number, and connectivity protector 350 could receive updates from an external administrator. In this example, connectivity protector 350 is provided by a firm for users to install, such users allowing the firm to change the threshold setting remotely if required.

T3. The threshold number could be set to an initial number, and connectivity protector 350 automatically tries different numbers to increase optimization. In an embodiment, count thresholds appropriate to a configuration of connectivity protector 350 may be determined experimentally, such as by detecting when an adverse response is instigated by a flood blocker 370 (also known as firewall blocker), e.g., when traffic is blocked, or connections are disrupted. In such an example, a pending tally that appears to have caused a problem may be recorded locally.

Continuing the discussion of technique T3, for example, if the initial threshold number is set to ten, over a period of time, threshold protector could increase the number to eleven, then twelve. At the point where countermeasures were enforced by flood blocker 370, an advantageous number would be known. It should be appreciated however, than embodiments of this approach can significantly, negatively impact user satisfaction in situations where flood blocker 370 is configured to inflict disruptive countermeasures. In an embodiment, this approach could be an option that is advantageously selectable by technically sophisticated users.

T4. In some embodiments, locally recorded configurations/thresholds may be transmitted to a centralized server. In some embodiments, a centralized server may distribute proposed thresholds and/or configuration information. In some embodiments, a client application may identify an intermediate firewall. For example, a client application may try to deduce what software or configuration is being run on a home router/firewall. In that example, based on the detected software or configuration, a threshold may be set, such as from a lookup table, or as supplied by a centralized server that specifies a threshold for a given software or configuration.

T5. In some embodiments, the presence (or lack of presence) of a firewall may be deduced by observing NAT (Network Address Translation) activity. In that example, patterns of NAT support may be used to distinguish between configurations of various firewalls. In some cases, information obtained by a client, such as by attempting to contact a firewall/router, such as at port 80, may be used to identify a firewall and/or configuration.

T6. In some embodiments, several of these sources of information may be combined, including but not limited to information gathered at centralized servers, and information gathered locally, such as inside the LAN protected by a firewall, to more precisely identify a firewall block value and/or configuration. In some embodiments, a count-threshold may be set relative to the deduced firewall configuration, such a fixed count below the detection threshold, or at a fixed percentage of the detection threshold, or some other function of the detection threshold. For example if the estimated block-threshold is 10, the protector-threshold can be set to be 20% below the estimated value, 8.

The above list of approaches T1-T6 is illustrative and not intended to limit the invention. As would be appreciated by one having skill in the relevant art, given the teachings herein, other approaches can be used to determine the threshold beyond the T1-T6 approaches.

Connectivity Protector Deployment

Figure 6:
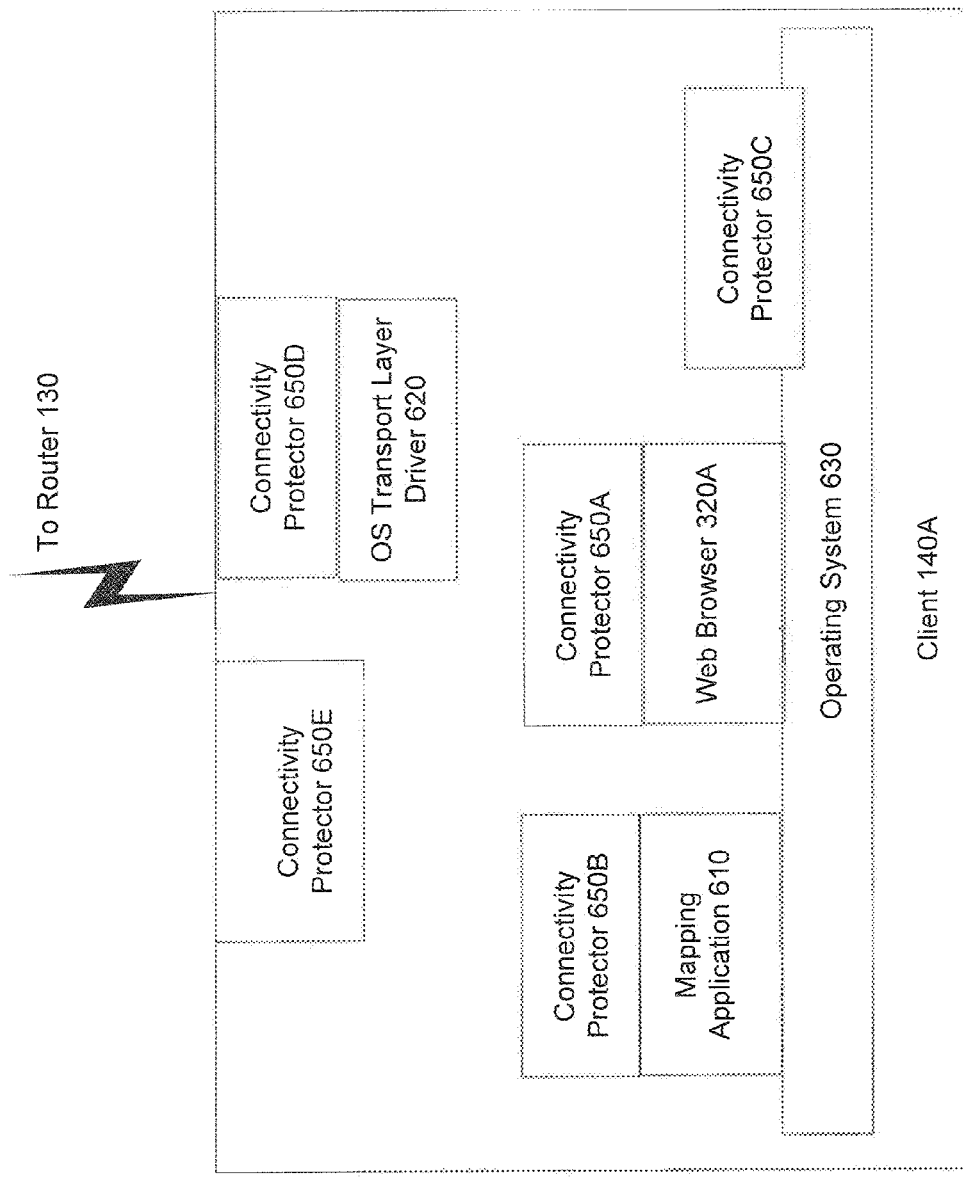
FIG. 6 describes different physical and logical placements for embodiments of connectivity protector.

FIG. 6 describes different physical and logical placements for embodiments of connectivity protector 650A-E. In different embodiments, connectivity protector 650A is installed as a component in web browser 320A, connectivity protector 650B is installed as a component in mapping application 610, connectivity protector 650C is installed as a component of operating system 630, connectivity protector 650D is installed as a component in OS transport layer driver 620 and/or connectivity protector 650E is a component of client 140A.

In an embodiment, connectivity protector 650A is installed as a component in web browser 320A. As noted above, certain modern web browsers can have significant speed increases over traditional browsers. In an embodiment, web browser 320A is a modern browser that has connectivity protector 650A installed to decrease the likelihood that generated browser requests will be misidentified as malicious traffic. In an embodiment, the installation of connectivity protector 650A can be a part of the main browser code, or installed as an "add-in" or other similar code addition.

In an embodiment, connectivity protector 650B is installed as a component in mapping application 610. Similar to the speed associated with web browser 320A, modern mapping applications, e.g., GOOGLE EARTH, from Google Inc., of Mountain View, Calif., can have performance characteristics that could trigger misinterpretation by flood blocker 270 from FIGS. 2-4. In an embodiment, to reduce this likelihood, as with web browser 320A above, connectivity protector 650B is installed in mapping application 610 either as a part of the main code or as an add-in component.

In an embodiment, connectivity protector 650C is installed as a component of operating system 630. Modern operating systems can avoid the requirement of component installation in each at-risk connected running application (e.g., connectivity protectors 650A-B) by having connectivity protector installed at the operating system 630 level. Such installation could be at the driver level, e.g., connectivity protector 650D installed in OS transport layer driver 620, or generally in the operating system main code, as with connectivity protector 650C.

In an embodiment, connectivity protector 650E is a component of client 140A. As discussed further with FIG. 9 below, connectivity protector 650E can be installed either in software or hardware. In an embodiment, connectivity protector 650E is a hardware component installed in client 140E—such installation including the hardware components of client 140A, e.g., in a network interface card (NIC) (not shown).

Erroneous UDP Flood Blocking

Figure 7:
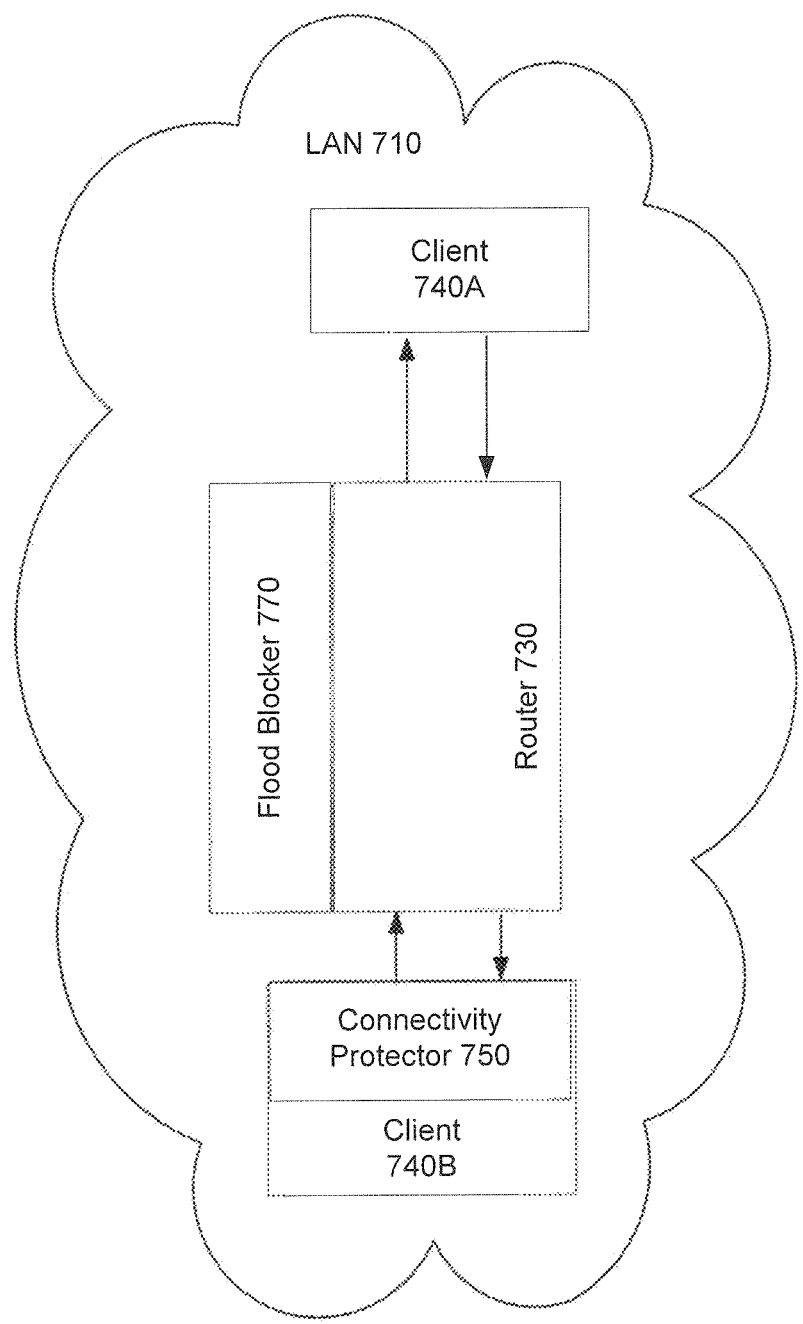
FIG. 7 illustrates another operation of a connectivity protector, according to an embodiment.

FIG. 7 shows an example of another type of connectivity protection that can be performed by connectivity protector 350. As described above, some embodiments of connectivity protector 350 are used to reduce the likelihood that legitimate traffic is not confused for malicious traffic. In examples above, one type of attack that is sought to be detected by flood blocker 270 is a SYN flood attack. Another type of attack that can be sought to be detected by flood blocker 270 is a UDP flood attack, also known as a "UDP port denial of service attack" and "UDP packet storm."

As is appreciated by one having skill in the relevant art, UDP is a message-based connectionless protocol, such connectionless protocols not setting up a dedicated end-to-end connection between nodes. Unlike the process of sending SYN requests discussed above with TCP, UDP connections are achieved by transmitting information in one direction from source to destination without verifying the readiness or state of the receiver.

In a type of UDP flood attack, within local area network (LAN) 710, a flood of malicious outbound connections is directed to one or more different clients on the network. In a process similar to the SYN request counting described above with flood blocker 270, in FIG. 7, flood blocker 770 seeks to prevent this type of attack by monitoring the total number of outbound UDP requests (e.g., requests for host response) for which no response has been received. In an example, the connection requests monitored by flood blocker 770 are domain name server (DNS) resolutions. If, for example, the total number of DNS resolutions to which no response has been received exceeds a threshold value, a block-response is initiated by flood blocker 770.

In an embodiment of connectivity protector 750, similar to connectivity protector 350 discussed with FIG. 3-5 above, the number of outbound UDP connection requests is counted and maintained below a count threshold, such count threshold being set below an estimated flood blocker 770 threshold.

In an embodiment, a counter that combines the unresponded SYN counter and the unresponded UDP request counter may be used. For example, some function of the two counters, such as the sum of the two counters, or the maximum of the counters may be used, for comparison to the earlier described threshold.

One having skill in the relevant art, with access to the teachings herein, will appreciate that the approaches to avoiding erroneous blocking responses described with embodiments above can be applied to other applications on different devices.

Method 800

Figure 8A:
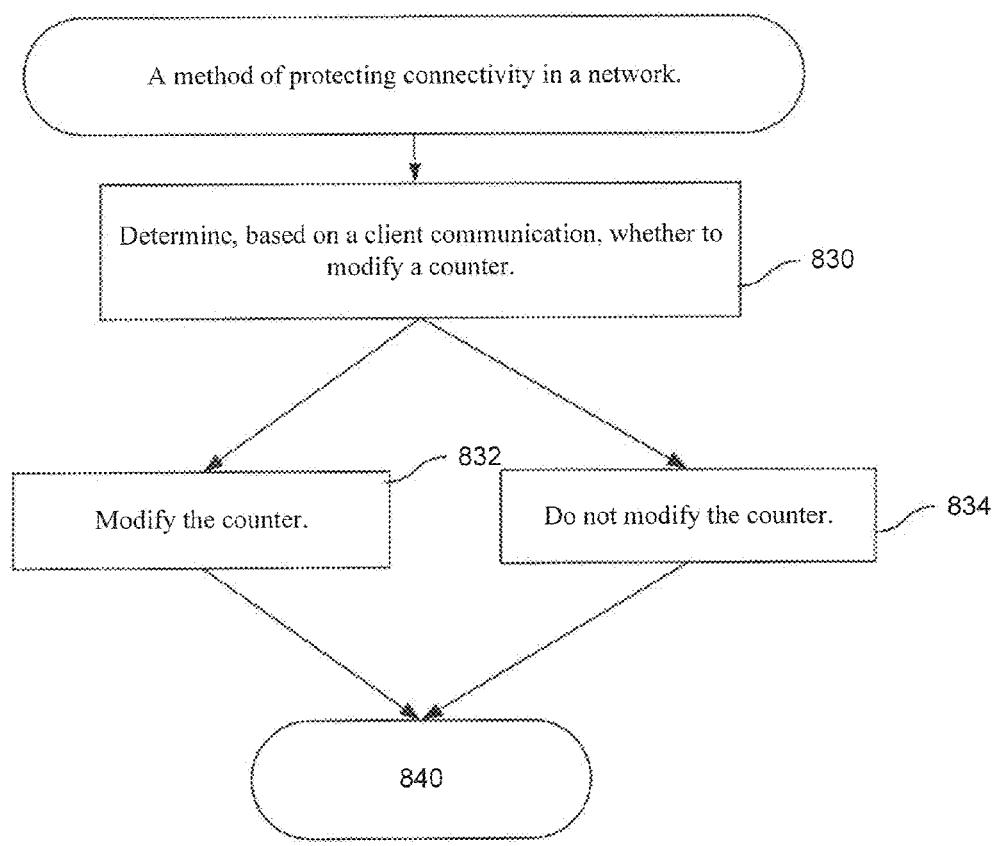
FIGS. 8A-C illustrate a flowchart of a computer-implemented method of protecting connectivity on a network according to an embodiment of the present invention.
Figure 8B:
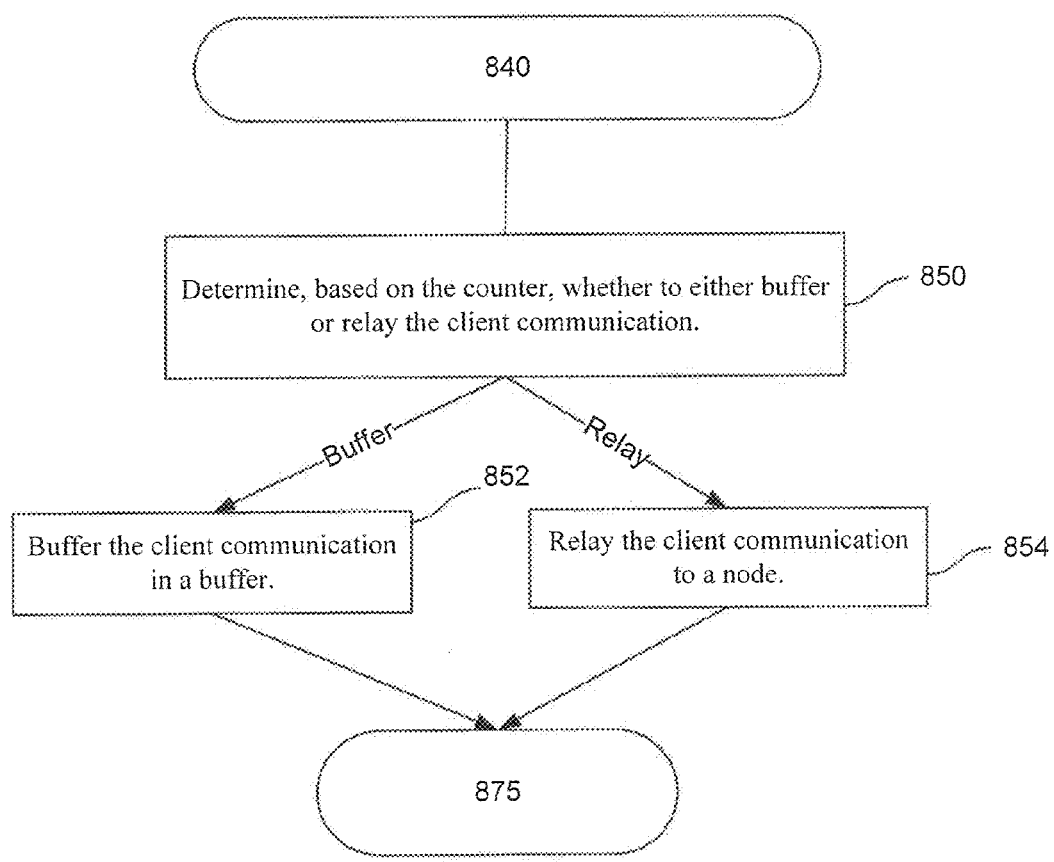
Figure 8C:
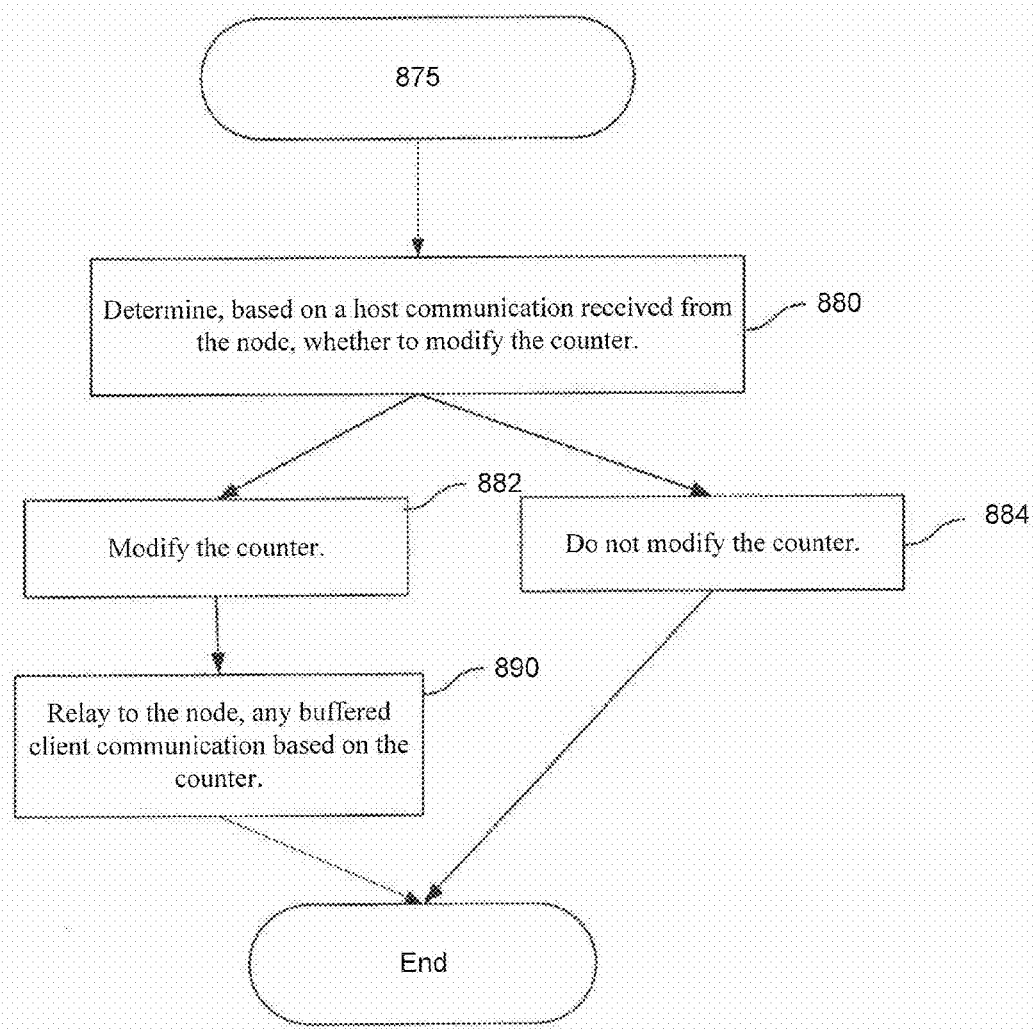

FIGS. 8A-C illustrate a more detailed view of how embodiments described herein may interact with other aspects of embodiments. In this example, a method protecting connectivity in a network is shown. Initially, as shown in stage 830 on FIG. 8A, a determination is made, based on a client communication, whether a counter is modified at stage 832, or not modified at stage 834. As shown in FIG. 8B, at stage 850, a determination is made, based on the counter, whether to buffer the client communication in a buffer at stage 852 or relay the client communication to a node at stage 854. Referring to FIG. 8C, at stage 880, a determination is made, based on a host communication received from the node, whether either the counter is modified at stage 882, and based on the counter, any buffered client communication is relayed to the node at stage 890, or at stage 884 the counter is not modified. After stages 890 and 884, the method ends.

Method 801

FIG. 8D illustrates another detailed view of how embodiments described herein may interact with other aspects. In this example, another embodiment of a method protecting connectivity in a network is shown. Initially, as shown in stage 802 in FIG. 8D, a client communication received from a client on the network is monitored. For example, connection monitor 510 of FIG. 5 can monitor client communication 410A received from web browser 320A operating on client 140A of FIG. 4. At stage 804, a determination is made, based on the monitoring of stage 802, to buffer the client communication. For example, connection monitor 510 can determine to buffer client communication 410A in outbound buffer 520. At stage 806, the client communication is buffered to avoid a flood block response from a node on the network, whereby connectivity of the client is protected. For example, client communication 410A can be buffered in outbound buffer 520, to avoid a flood blocking response from flood blocker 370. After stage 806, the method ends.

Example Computer System Implementation

Figure 9:
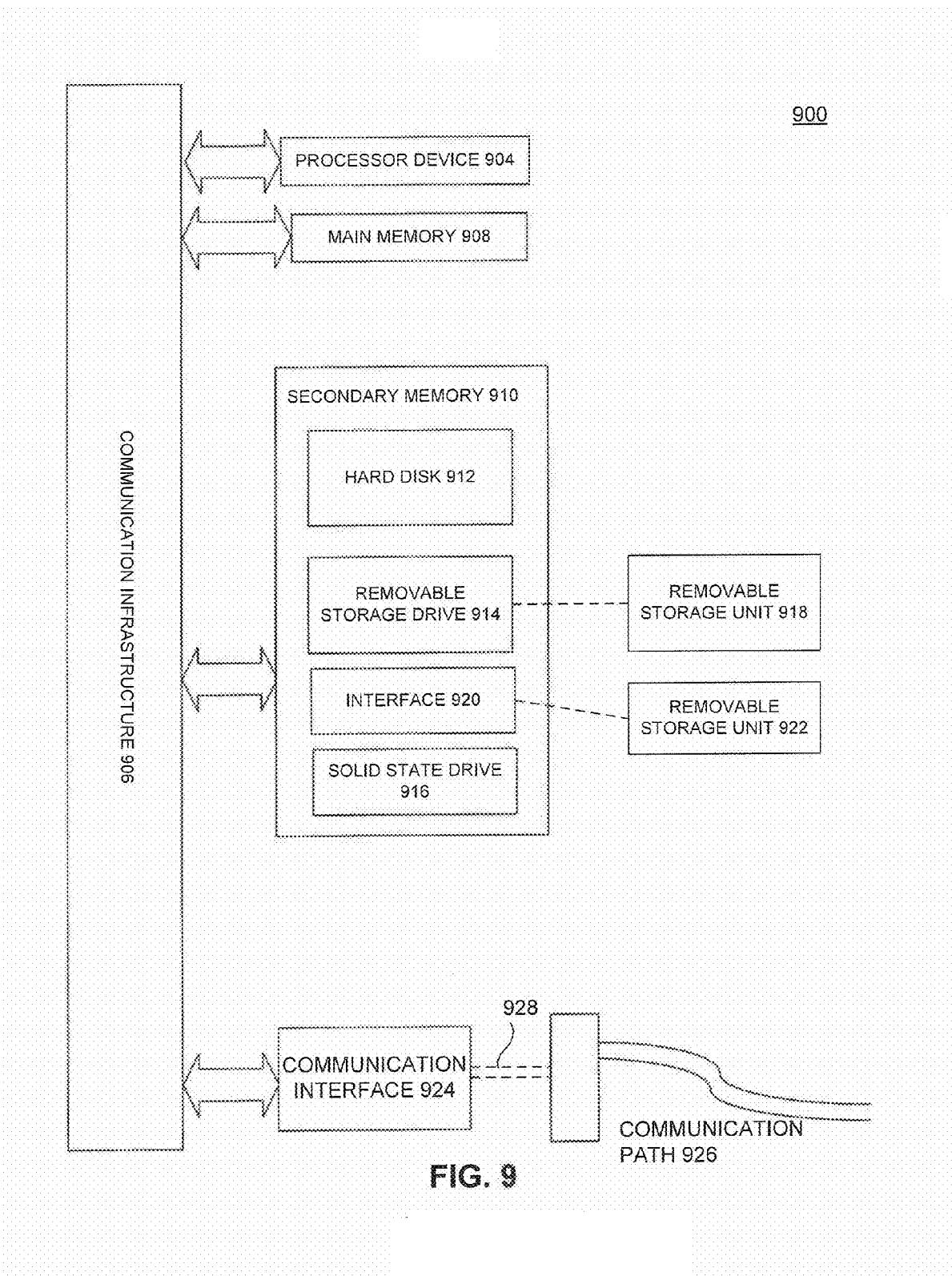
FIG. 9 depicts a sample computer system that may be used to implement one embodiment.

FIG. 9 illustrates an example computer system 900 in which embodiments of the present invention, or portions thereof, may be implemented. For example, portions of systems or methods illustrated in FIGS. 2-8D may be implemented in computer system 900 using hardware, software, firmware, tangible computer readable media having instructions stored thereon, or a combination thereof and may be implemented in one or more computer systems or other processing systems. Hardware, software or any combination of such may embody any of the modules/components in FIGS. 2-7 and any stage in FIGS. 8A-D. Clients 140A-C and hosts 110A-C can also be implemented having components of computer system 900.

If programmable logic is used, such logic may execute on a commercially available processing platform or a special purpose device. One of ordinary skill in the art may appreciate that embodiments of the disclosed subject matter can be practiced with various computer system and computer-implemented device configurations, including smartphones, cell phones, mobile phones, tablet PCs, multi-core multiprocessor systems, minicomputers, mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor 'cores.'

Various embodiments of the invention are described in terms of this example computer system 900. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 904 may be a special purpose or a general purpose processor device. As will be appreciated by persons skilled in the relevant art, processor device 904 may also be a single processor in a multi-core/multiprocessor system, such system operating alone, or in a cluster of computing devices operating in a cluster or server farm. Processor device 904 is connected to a communication infrastructure 906, for example, a bus, message queue, network or multi-core message-passing scheme.

Computer system 900 also includes a main memory 908, for example, random access memory (RAM), and may also include a secondary memory 910. Secondary memory 910 may include, for example, a hard disk drive 912, removable storage drive 914 and solid state drive 916. Removable storage drive 914 may include a floppy disk drive, a magnetic tape drive, an optical disk drive, a flash memory, or the like. The removable storage drive 914 reads from and/or writes to a removable storage unit 918 in a well known manner. Removable storage unit 918 may include a floppy disk, magnetic tape, optical disk, etc. which is read by and written to by removable storage drive 914. As will be appreciated by persons skilled in the relevant art, removable storage unit 918 includes a computer usable storage medium having stored therein computer software and/or data.

In alternative implementations, secondary memory 910 may include other similar means for allowing computer programs or other instructions to be loaded into computer system 900. Such means may include, for example, a removable storage unit 922 and an interface 920. Examples of such means may include a program cartridge and cartridge interface (such as that found in video game devices), a removable memory chip (such as an EPROM, or PROM) and associated socket, and other removable storage units 922 and interfaces 920 which allow software and data to be transferred from the removable storage unit 922 to computer system 900.

Computer system 900 may also include a communications interface 924. Communications interface 924 allows software and data to be transferred between computer system 900 and external devices. Communications interface 924 may include a modem, a network interface (such as an Ethernet card), a communications port, a PCMCIA slot and card, or the like. Software and data transferred via communications interface 924 may be in the form of signals, which may be electronic, electromagnetic, optical, or other signals capable of being received by communications interface 924. These signals may be provided to communications interface 924 via a communications path 926. Communications path 926 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 918, removable storage unit 922, and a hard disk installed in hard disk drive 912. Computer program medium and computer usable medium may also refer to memories, such as main memory 908 and secondary memory 910, which may be memory semiconductors (e.g., DRAMs, etc.).

Computer programs (also called computer control logic) are stored in main memory 908 and/or secondary memory 910. Computer programs may also be received via communications interface 924. Such computer programs, when executed, enable computer system 900 to implement the present invention as discussed herein. In particular, the computer programs, when executed, enable processor device 904 to implement the processes of the present invention, such as the stages in the method illustrated by flowchart 800 of FIGS. 8A-C discussed above. Accordingly, such computer programs represent controllers of the computer system 900. Where the invention is implemented using software, the software may be stored in a computer program product and loaded into computer system 900 using removable storage drive 914, interface 920, hard disk drive 912 or communications interface 924.

Embodiments of the invention also may be directed to computer program products comprising software stored on any computer useable medium. Such software, when executed in one or more data processing device, causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

CONCLUSION

Embodiments described herein relate to methods and apparatus for protecting connectivity in a network. The summary and abstract sections may set forth one or more but not all exemplary embodiments of the present invention as contemplated by the inventors, and thus, are not intended to limit the present invention and the claims in any way.

The embodiments herein have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

The foregoing description of the specific embodiments will so fully reveal the general nature of the invention that others may, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the claims and their equivalents.

What is claimed is:

1. A method of protecting connectivity in a network, comprising:
    monitoring, at a client device, one or more requests to connect to the network;
    determining, based on the monitoring, a count of the one or more requests received from the client device and transmitted over the network for which a corresponding acknowledgment has not been received from the network opening a connection;
    determining that the one or more requests are relevant to a flood blocking response to the client device from a node on the network, wherein the flood blocking response comprises blocking of communication from the client device to the network when the count exceeds a blocking threshold of the node on the network;
    determining, at the client device, that the count exceeds a buffering threshold that buffers the one or more requests, wherein the buffering threshold is different than the blocking threshold of the node on the network, and wherein communication from the client device to the network is blocked by the node when the count exceeds the blocking threshold; and
    buffering, at the client device, the one or more requests prior to releasing the one or more buffered requests to the network when the count exceeds the buffering threshold.

2. The method of claim 1, wherein the one or more requests include a request for host connectivity.

3. The method of claim 2, wherein the request for host connectivity is a Transmission Control Protocol (TCP) SYN request.

4. The method of claim 2, wherein the request for host connectivity is a User Datagram Protocol (UDP) connection request.

5. The method of claim 1, further comprising:
    monitoring a host communication received from a host;
    determining, based on the monitoring, to release a buffered communication to the network; and
    releasing the buffered communication to the network.

6. The method of claim 5, wherein the host communication is an acknowledgement of a request for host connectivity.

7. The method of claim 6, wherein the acknowledgement of a request for host connectivity is a TCP ACK response.

8. The method of claim 6, wherein the acknowledgement of a request for host connectivity is a confirmation of an established UDP connection.

9. The method of claim 5, wherein the determining to release is based on a threshold.

10. The method of claim 9, wherein the threshold is a limiting threshold selected by estimating the blocking threshold of a flood blocker of the node.

11. The method of claim 9, wherein the threshold is received from an external source.

12. The method of claim 5, wherein the monitoring is based on incrementing and decrementing a counter, and the determining the count is based on a value of the counter.

13. The method of claim 1, wherein the node is one of a router, a modem or a switch.

14. The method of claim 1, wherein the buffering further comprises allowing select communication received from the client device to transmit on the network, wherein the select communication does not include requests to connect to the network.

15. An apparatus for protecting connectivity on a network, comprising:
    a processor;
    a tangible memory;
    an outbound buffer; and
    a connection monitor that, when executed by the processor:
    monitors, at a client device, one or more requests to connect to the network,
    and upon receipt of the one or more requests:
    determines, based on the monitoring, a count of the one or more requests received from the client device and transmitted over the network for which a corresponding acknowledgment has not been received from the network opening a connection, determines that the one or more requests are relevant to a flood blocking response to the client device from a node on the network, wherein the flood blocking response comprises blocking of communication from the client device to the network when the count exceeds a blocking threshold of the node on the network;

determines, at the client device, that the count exceeds a buffering threshold that buffers the one or more requests, wherein the buffering threshold is different than the blocking threshold of the node on the network, and wherein communication from the client device to the network is blocked by the node when the count exceeds the blocking threshold; and buffers, at the client device, the one or more requests prior to releasing the one or more buffered requests to the network when the count exceeds the buffering threshold.

16. The apparatus of claim 15, wherein the one or more requests include a TCP SYN request.

17. The apparatus of claim 15, wherein the one or more requests include a User Datagram Protocol (UDP) connection request.

18. The apparatus of claim 15, further comprising:
a threshold tester, wherein the connection monitor is further configured to, upon receipt of the one or more requests, determine to buffer the one or more requests based on a threshold and the threshold tester.

19. The apparatus of claim 18, wherein the threshold is selected by estimating a blocking threshold of a flood blocker by automatically testing the flood blocker.

20. The apparatus of claim 15, further comprising:
a confirmation receiver configured to monitor a host communication received from a host, wherein upon receipt of the host communication, the confirmation receiver determines, based on the monitoring of the confirmation receiver, to release a buffered communication from the buffer.

21. The apparatus of claim 20, wherein the host communication is a TCP SYN ACK response.

22. The apparatus of claim 20, wherein the host communication is a confirmation of an established UDP connection.

23. The apparatus of claim 20, further comprising a counter, wherein the monitoring of the connection monitor and the confirmation receiver is a based on the counter, and the determining of the connection monitor and the confirmation receiver is based on a value of the counter.

24. A computer-readable memory having computer-executable instructions stored thereon that, when executed by a computing device, cause the computing device to perform a method of protecting connectivity in a network, comprising:
monitoring, at a client device, one or more requests to connect to the network;

determining, based on the monitoring, a count of the one or more requests received from the client device and transmitted over the network for which a corresponding acknowledgment has not been received from the network opening a connection;

determining that the one or more requests are relevant to a flood blocking response to the client device from a node on the network, and wherein the flood blocking response comprises blocking of communication from the client device to the network when the count exceeds a blocking threshold of the node on the network;

determining, at the client device, that the count exceeds a buffering threshold that buffers the one or more requests, wherein the buffering threshold is different than the blocking threshold of the node on the network, and wherein communication from the client device to the network is blocked by the node when the count exceeds the blocking threshold; and buffering, at the client device, the one or more requests prior to releasing the one or more buffered requests to the network when the count exceeds the buffering threshold.

* * * * *